July 7, 1959  G. G. HEBARD ET AL  2,893,595
METERING SYSTEM
Filed Nov. 19, 1956
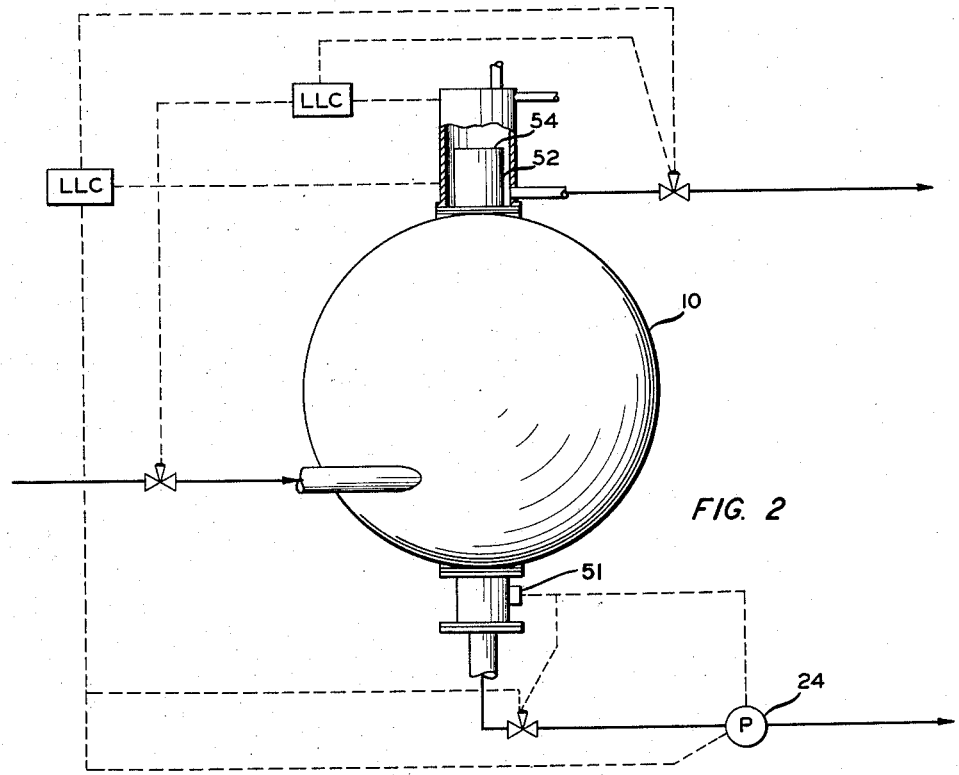
FIG. 2
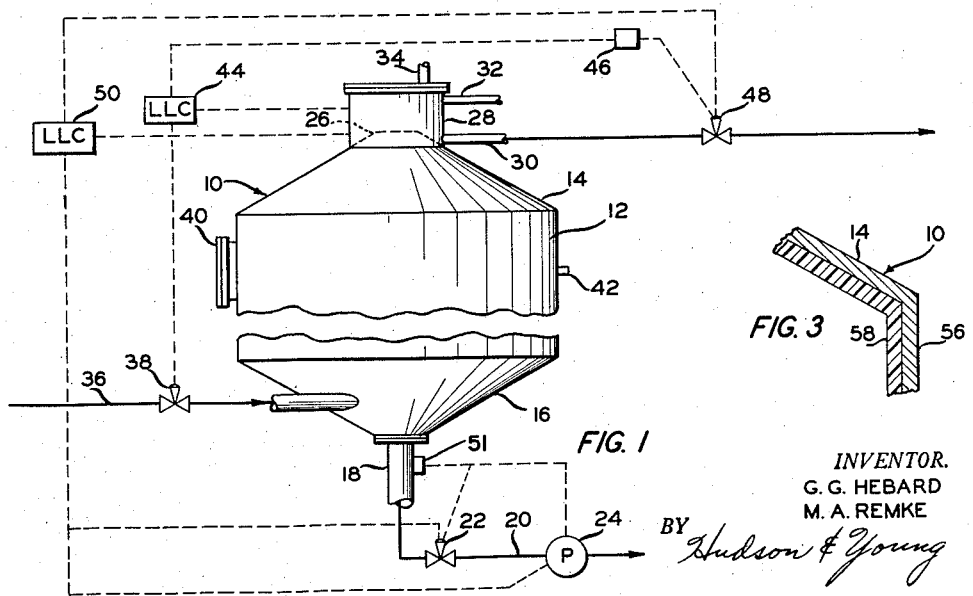
FIG. 1
FIG. 3
INVENTOR.
G. G. HEBARD
M. A. REMKE
BY *Hudson & Young*
ATTORNEYS

United States Patent Office 2,893,595
Patented July 7, 1959

2,893,595

METERING SYSTEM

Glen G. Hebard and Marvin A. Remke, Bartlesville, Okla., assignors to Phillips Petroleum Company, a corporation of Delaware Application November 19, 1956, Serial No. 622,863

14 Claims. (Cl. 222—1)

This invention relates to a metering system and to a process for accurately measuring and metering liquid flow. A specific aspect of the invention pertains to a metering tank and process for metering the flow of liquid hydrocarbons such as crude oil from storage to pipeline.

In recent years, considerable interest has been evidenced in automatic crude oil handling and some successful installations have been made. One important consideration in such automatic handling is accurate metering of the oil sold to the pipeline. Usually, a calibrated tank is used as a positive displacement meter. To obtain an accurately determined amount of oil at each filling of the tank, the upper level is established by draining over a weir. Two types of weir installations have been used. One type comprises a drainpipe connected into the upper portion of the side wall of the tank, this drainpipe being provided with a horizontal flat plate over which the oil drains. Another type comprises a short vertical section of pipe inside the tank, the pipe being closed at the end connected with a side outlet.

The above described weirs are effective in obtaining an accurate upper level when the tanks are filled, but have a serious disadvantage in that a considerable amount of time is required for the tanks to drain to the weir level, since the weirs are draining the full area of the tanks and the rate of flow over the weirs becomes very slow when the head of liquid above the weirs is reduced.

It is accordingly an object of the invention to provide an improved metering system for liquids. Another object of the invention is to provide a metering tank having a faster rate of metering liquids than metering tanks heretofore available. A further object is to provide a metering tank having a fast drain down time to "full" level. It is also an object of the invention to provide an improved process for metering of liquids. Other objects of the invention will become apparent from a consideration of the accompanying disclosure.

The present invention comprises an improved upper level drain for a metering tank which provides an accurate upper level control for the tank and requires a minimum drain down time. Another aspect of the invention resides in particular tank configurations in combination with the drain down structure which cooperate to provide quick drain down and accurate metering of the fluid passing thru the tank. In one embodiment of the invention, the tank is an upright cylinder having a frusto-conical top and a frusto-conical bottom. In another configuration the tank is spherical. In each instance the tank is provided with a horizontal overflow orifice, aperture, or weir in the uppermost section thereof and this overflow element is inclosed within an overflow vessel which extends from a level below the level of the overflow aperture to a level above the same so that upon filling the tank thru the inlet line thereto, the liquid fills to the aperture and then overflows into the overflow vessel until the liquid level rises above the level of the aperture. A drain line in the overflow vessel below the level of the aperture provides fast draindown to the level of the aperture so that a fixed and constant volume of liquid is present in the tank to the level of the aperture. By draining the tank to a fixed lower level, preferably in an upright outlet conduit at the bottom of the tank, an accurate measure of liquid is effected each time the tank is filled to the aperture and drained down to the fixed level. The invention also comprises an automatic flow-control system which fills and drains the tank without manual control.

A more complete understanding of the invention may be had by reference to the accompanying schematic drawing of which Figure 1 is an elevation of a preferred embodiment of the metering tank of the invention together with automatic controls for the operation thereof; Figure 2 is an elevation of a spherical tank designed and arranged in accordance with the invention together with controls for its operation; and Figure 3 is a partial section of the tank of Figure 1. Corresponding parts in the various figures are correspondingly numbered.

Referring to Figure 1, an upright cylindrical metering tank 10 comprises a cylindrical section 12, a frusto-conical top closure 14 and a frusto-conical bottom closure 16. Bottom closure 16 converges to an outlet line 18 which leads to a pump line 20 in which is positioned a motor valve 22 and a pump 24. Top closure member 14 terminates at its upper end in a horizontal aperture 26 which provides an overflow weir for liquids pumped into the tank. An overflow vessel 28 of slightly larger horizontal cross section than the area of aperture 26 encloses the upper open end of the tank (aperture 26), extending from a level below to a level above the level of the aperture. Overflow vessel 28 is provided with a drain line 30 and an overflow line 32, as well as a gas vent 34.

Tank 10 is also provided with an inlet line 36 in which is positioned a motor valve 38. A manhole 40 is provided in the cylindrical section of the tank for inspection, repair, or reconditioning as required. A temperature probe 42 is also provided in an intermediate section of the tank for ascertaining the temperature of the liquid being metered in order to accurately calculate the amount of liquid being metered.

A liquid level controller 44 is sensitive to the liquid level in overflow vessel 28 and operates when the liquid level therein reaches a desired selected level anywhere between the level of aperture 26 and the level of outlet line 32, closing motor valve 38 when said level is reached. Controller 44 also actuates a time delay relay 46 which after a short delay operates motor valve 48 in line 30 to open the same and allow liquid to drain down in vessel 28 to a level below the level of aperture 26. A second liquid level controller 50 is sensitive to the liquid level in overflow vessel 28 at a level below aperture 26 so that when the liquid is drained down to the level below said aperture, controller 50 closes motor valve 48 and opens motor valve 22 in line 20. The controller also actuates the switch on pump 24 so as to start the pump and drain the tank to the desired level. When the liquid in tank 10 has been drained to a desired level, such as a level in upright conduit 18, a level sensing device 51 therein operates motor valve 22 thereby closing the same and also shuts off pump 24 thereby preparing the system for a refill of tank 10. The entire operation of the controls is effected from a control panel (not shown) which together with specific control features are the subject of a copending application of M. A. Remke et al., Serial No. 686,255, filed September 25, 1957, now abandoned.

Figure 2 shows an embodiment of a metering tank differing from that of Figure 1 particularly in the spherical configuration of the tank itself and also in the aperture or weir arrangement. In this arrangement an upright conduit 52 is positioned over an opening in the top of the tank and is sealed thereto so as to provide an overflow aperture or weir 54 at the horizontal upper end of the conduit. The control system for the tank of Figure 2 is similar to that of the tank of Figure 1.

It is preferred to position inlet line 36 tangentially with respect to the tank and in a lower section of the tank so as to prevent or at least minimize solid deposits when metering crude oil. This feature is not so significant when metering liquids which do not contain depositable materials.

In one embodiment of the invention the tank is fabricated of metal and lined with a suitable polymeric material which is impervious to the liquid being metered. When crude oil is being metered the smoothness of the polymeric material and its low affinity for solid materials contained in the crude oil tend to minimize solid deposits on the interior of the tank and thereby contribute to the accuracy in metering such liquids. Figure 3 shows a partial cross section of tank 10 of Figure 1 showing a metal shell 56 and a polymeric or plastic lining 58. In one installation of tanks of the type of Figure 1, an "Epon" base plastic (epichlorohydrin type resin) was coated on the inside of the tanks. Other suitable coating materials include: modified phenolic resins, polyvinylchloride, tetrafluoroethylene, and glass.

The required characteristics of the internal coating are that it have a firm bond with the steel shell, have a smooth surface to resist deposition of paraffin and like materials contained in crude oil, and that the coating resist deterioration from contact with the crude oil or other liquid introduced to the vessel.

The invention is particularly effective and accurate because of the fast draindown to a fixed "full" level and also to a fixed "empty" level in an upright conduit leading from the tank outlet. An embodiment of the invention represented by Figure 1 has been tested and put into use on a commercial scale in metering crude oil to a product pipe line in the Burbank field at Burbank, Oklahoma. A pair of metering tanks of approximately 100 barrel capacity were positioned side by side close to a battery of storage tanks and these metering tanks were arranged in a system which permitted alternate filling and emptying of the tanks so that one tank was filling while the other was being emptied and vice versa. Each tank was filled and emptied 25 times in a 24 hour period. The accuracy of the metering system has been successfully tested and has been accepted as completely reliable by crude oil purchasers.

Certain modifications of the invention will become apparent to those skilled in the art and the illustrative detail disclosed are not to be construed as imposing unnecessary limitations on the invention.

We claim:

1. A metering system for liquids comprising a tank having a liquid overflow aperture in its top section, a liquid dispensing outlet in its bottom section, and a liquid inlet below said aperture for filling said tank; a catch vessel adjacent said aperture extending from below to above the level of said aperture, being adapted to catch the liquid overflow from said tank thru said aperture; a liquid drain outlet from said vessel below said level which drains liquid in said vessel above said level down below said level to provide a fixed liquid level in said tank at said aperture; and means in the upper section of said vessel above said level for egress and ingress of gas during filling of said tank with liquid thru said liquid inlet and emptying of same thru said liquid dispensing outlet, respectively.

2. The system of claim 1 wherein the upper section of said tank converges to said aperture and said vessel forms an annulus around said aperture.

3. The system of claim 1 wherein said tank comprises a cylindrical main section and frusto-conical top and bottom sections, said aperture coinciding with the upper end of said top section.

4. The system of claim 3 wherein said aperture is small in relation to said tank and said vessel encircles said aperture and is only slightly larger in diameter than said aperture.

5. The system of claim 1 wherein said tank is spherical and said aperture opens into an upright conduit open at the top, said vessel extending above the level of the top of said conduit and forming an annulus with said conduit.

6. A metering system for accurately metering liquids comprising a tank having a liquid overflow aperture in horizontal position in its top section, a liquid dispensing outlet line from its bottom section, and a liquid inlet line intermediate said aperture and said outlet for filling said tank with liquid; an upright vessel surrounding said aperture and sealed with said tank to receive overflow liquid, said vessel forming an annulus around said aperture extending below the level of said aperture; a liquid drain outlet line from said vessel below the level of said aperture; a port in the top section of said vessel above said level for ingress and egress of fluid; a valve in each said outlet line and in said inlet line; means for sensing the liquid level in said vessel intermediate the level of said aperture and said port and closing the valve in said inlet line; means for sensing the liquid level in said vessel below the level of said aperture and for closing the valve in said drain outlet line and opening the valve in said dispensing outlet line.

7. The system of claim 6 including means for sensing liquid level in said dispensing outlet line from the bottom section of said tank just below said tank and closing the valve in said last mentioned outlet line.

8. A metering system comprising a tank having an upright cylindrical section and top and bottom frustoconical sections, said top section terminating in a liquid overflow aperture and said bottom section terminating in a liquid dispensing outlet line; an upright cylindrical vessel sealed to said tank around said aperture at a level below same providing an annulus for liquid around said aperture and extending above the level of same; a liquid drain outlet in said vessel below the level of said aperture; an opening in the upper section of said vessel for ingress and egress of fluid; and a liquid inlet line connected with said tank for filling same with liquid.

9. The system of claim 8 wherein said inlet line is connected tangentially to said bottom section.

10. The system of claim 9 wherein said tank is lined with plastic so as to minimize adherence of solids to said tank.

11. A method of metering liquids which comprises introducing the liquid to be metered into a confined metering zone having a horizontal overflow aperture in its uppermost section and a fixed drain-down level in its lower section so as to fill said zone and overflow said aperture; catching the overflow in an overflow zone adjacent said aperture; cutting off the flow of liquid into said metering zone when the level of liquid in said overflow zone rises above said aperture; thereafter, draining said liquid directly from said overflow zone thru a drain outlet therein to a level below said aperture, thereby leaving in said metering zone a fixed volume of liquid between said aperture and said drain-down level; and thereafter, dispensing said fixed volume of liquid from said metering zone.

12. The process of claim 11 wherein said fixed draindown level is in an upright outflow zone of relatively small cross section at the bottom of said metering zone.

13. A method of metering liquids which comprises introducing the liquid to be metered into a confined metering zone having a horizontal overflow aperture in its uppermost section so as to overflow said aperture; draining said liquid down to said overflow aperture; and thereafter draining said liquid from said metering zone to a fixed level therein below said aperture to obtain a constant volume of liquid drain-off, thereby dispensing said constant volume of liquid.

14. The process of claim 13 wherein said fixed level is in a restricted out-flow zone from said metering zone.

References Cited in the file of this patent

UNITED STATES PATENTS

| | | |
|---|---|---|
| 1,346,898 | Kingsbury | July 20, 1920 |
| 1,907,001 | Peter | May 2, 1933 |
| 2,434,596 | Spieth | Jan. 13, 1948 |
| 2,667,178 | Fred et al. | Jan. 26, 1954 |
| 2,753,098 | Ward | July 3, 1956 |

FOREIGN PATENTS

| | | |
|---|---|---|
| 769,538 | France | June 6, 1934 |
| 1,035,870 | France | Apr. 22, 1953 |